United States Patent [19]

Erickson et al.

[11] Patent Number: 5,534,876
[45] Date of Patent: Jul. 9, 1996

[54] MULTIPATH TOLERANT LOCATION SYSTEM AND METHOD THEREFOR

[75] Inventors: Bart J. Erickson, Scottsdale; Neal R. Anderson, Mesa, both of Ariz.

[73] Assignee: Motorola, Inc., Schaumburg, Ill.

[21] Appl. No.: 209,171

[22] Filed: Mar. 10, 1994

[51] Int. Cl.$^6$ .................................................. G01S 1/24
[52] U.S. Cl. ........................ 342/387; 342/463; 342/465; 340/825.49
[58] Field of Search ................................ 342/387, 463, 342/465, 187; 340/825.49, 992

[56] References Cited

U.S. PATENT DOCUMENTS

| | | | |
|---|---|---|---|
| 3,150,372 | 9/1964 | Groth, Jr. | 343/112 |
| 3,307,192 | 2/1967 | Attwood | 343/112 |
| 3,848,254 | 11/1974 | Drebinger et al. | 343/112 R |
| 3,886,554 | 5/1975 | Braur et al. | 343/112 R |
| 4,229,737 | 10/1980 | Heldwein et al. | 343/6 R |
| 4,975,707 | 12/1990 | Smith | 342/357 |
| 5,051,741 | 9/1991 | Wesby | 340/825.49 |
| 5,115,104 | 6/1992 | Heller | 342/450 |
| 5,365,516 | 11/1994 | Jandrell | 370/18 |

OTHER PUBLICATIONS

An article entitled "Accuracy Limitations of Hyperbolic Multilateration Systems" by H. B. Lee, IEEE Transactions Aerospace and Electronic Ssytems, vol. AES–11, No. 1, Jan. 1975, pp. 16–29.

An article entitled "A Novel Procedure for Assessing the Accuracy of Hyperbolic Multilateration Systems": by H. B. Lee, IEEE Transactions Aerospace and Electronic Systems, vol. AES–11, No. 1, Jan. 1975, pp. 2–15.

An article entitled "Implementation of Geostar®RDSS Spread Spectrum Receiver" by M. Motamedi et al., IEEE/IEICE Global Telecommunications Conference 1987, Nov. 15–18, 1987, pp. 1675–1678.

An article entitled "Statistical Theory of Passive Location Systems" by D. J. Torrieri, IEEE Transactions on Aerospace and Electronic Systems, vol. AES–20, No. 2, Mar. 1984, pp. 183–198.

*Primary Examiner*—Thomas H. Tarcza
*Assistant Examiner*—Dao L. Phan
*Attorney, Agent, or Firm*—Bradley J. Botsch, Sr.; Jeffrey D. Nehr

[57] ABSTRACT

A multilateration location system (12) includes a locatable unit (16) and any number of known-position locators (14). A time of arrival detector (22) determines instants in time when a location signal (20) transmitted by the locatable unit (16) arrives at various known-position locators (14). For each combination of two known-position locators (14) that receive the location signal (20), a pre-estimation process (32) determines whether the difference in arrival times is less than or equal to a maximum propagation duration for the locator pair. The maximum propagation duration is based upon the distance between the locators (14) in the locator pair. If the difference is greater than the maximum propagation duration, the difference is omitted from the data set processed by a multilateration calculation process (34). A post estimation filtering process (36) screens out location estimates that are too distant from a predicted position.

23 Claims, 4 Drawing Sheets

5,534,876

1

MULTIPATH TOLERANT LOCATION SYSTEM AND METHOD THEREFOR

TECHNICAL FIELD OF THE INVENTION

The present invention relates generally to location determination systems. More specifically, the present invention relates to location determination systems that tolerate multipath transmissions.

BACKGROUND OF THE INVENTION

Numerous systems are known in which a position of a locatable unit is determined. Often, such location systems use location signals communicated between the locatable unit and one or more known-position locators. The locatable unit may only transmit location signals, only receive location signals, or both transmit and receive location signals.

Location systems have been configured that use ultrasonic location signals, infrared location signals, and electromagnetic location signals. Ultrasonic and infrared systems are most often used when locations are determined within small monitored areas. However, even when used over small areas ultrasonic and infrared systems are unreliable. For example, ultrasonic signal receivers are unacceptably prone to false alarms while infrared signal receivers are unacceptably prone to failures in detecting valid alarm signals. Furthermore, if ultrasonic or infrared systems are expanded to cover medium size or larger areas, the system becomes unacceptably costly due to the large number of known-position locators required to extend the detection area.

Electromagnetic systems are better suited to determining locations over large areas. Two techniques are conventionally used to determine a locatable unit's position. In accordance with multiangulation location systems, the location signals are used to determine azimuths between the locatable unit and each of multiple known-position locators. Using trigonometry, these azimuths are processed into a position for the locatable unit relative to the known-position locators. Unfortunately, the determination of azimuths is a complex operation that requires costly equipment.

Multilateration systems are typically less complex and costly than multiangulation systems because they do not determine angles. In accordance with multilateration systems, the location signals are used to determine propagation delays between the locatable unit and each of multiple known-position locators. The location signals propagate between the locatable unit and known-position locators at constant speed. Due to differences in spacing between the locatable unit and various known-position locators, these propagation delays may be processed into a position for the locatable unit relative to the known-position locators.

Conventional electromagnetic location systems are highly sensitive to multipath propagation. Multipathing results when the location signals reach a receiver at either a locatable unit or known-position locator by an indirect or reflected path, and often by two or more paths. In both multiangulation and multilateration systems, the multipath or reflected signals corrupt the locations determined by the system. Consequently, such systems are typically used over wide open spaces where the multipathing phenomenon is minimized.

On the other hand, a need exists for a location system that reliably operates over small and medium size areas. Such areas may include a building, a campus consisting of several buildings and open areas, or an entire urban area. The

2 structures in these small and medium size areas present a severe multipathing problem for a location system that relys upon electromagnetic signals. Consequently, conventional electromagnetic systems exhibit poor performance in these situations.

SUMMARY OF THE INVENTION

Accordingly, it is an advantage of the present invention that an improved location system and method are provided.

Another advantage of the present invention is that a location system and method which use electromagnetic location signals and which tolerate multipathing are provided.

Another advantage is that the present invention provides a multilateration location system and method that need not include the complexity required to determine azimuths.

Another advantage is that the present invention provides a multilateration system and method that use location signal timing data to reject multipath signals.

Another advantage is that the present invention provides a multilateration system and method that qualify current locations based upon past locations to screen out positions calculated in response to multipath signals.

Another advantage is that the present invention provides a multilateration system and method which identify multipath data without excessive complexity and without using excessive processing power.

The above and other advantages of the present invention are carried out in one form by a multipath tolerant method for determining a location of a locatable unit. The method calls for determining a maximum propagation duration. The maximum propagation duration is determined in response to the distance between first and second known-position locators. A time difference is determined. The time difference is approximately equal to the difference between the propagation delay for a location signal traveling between the locatable unit and the first known-position locator and the propagation delay for a location signal traveling between the locatable unit and the second known-position locator. The method verifies that the time difference is less than or equal to the maximum propagation duration. A current location for the locatable unit is calculated in response to this verification.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
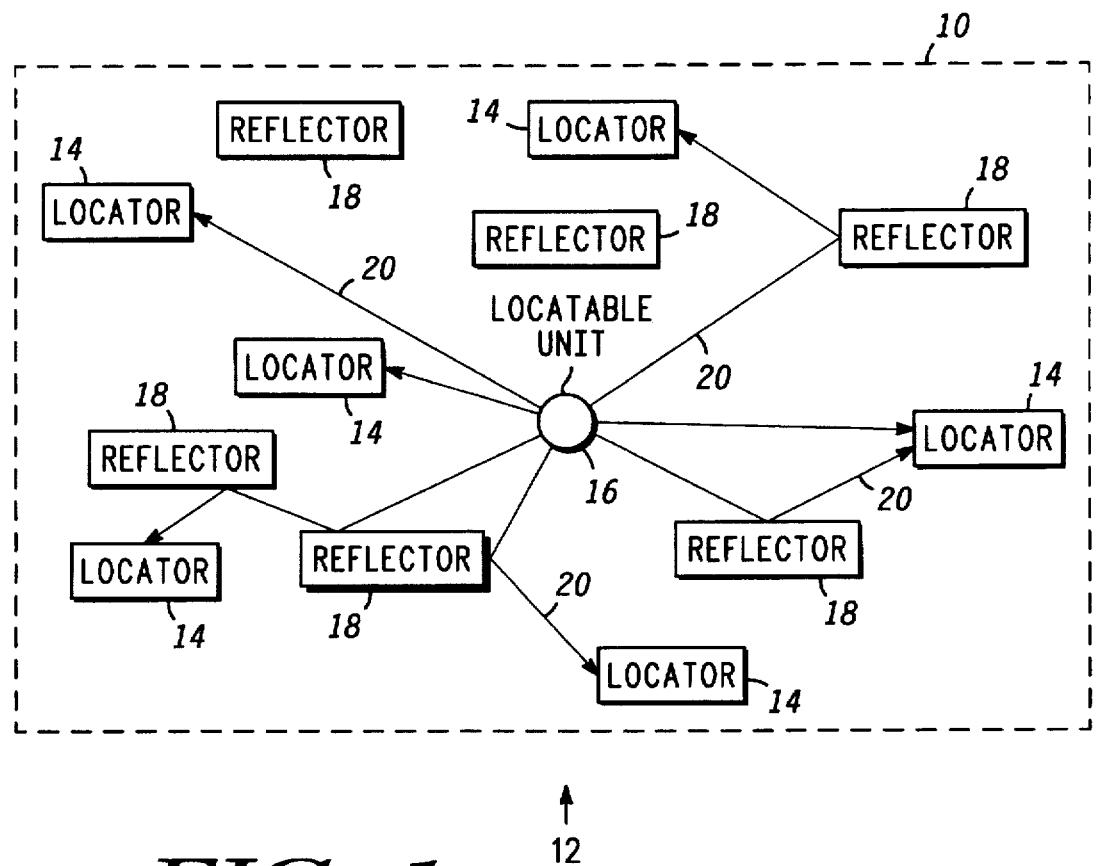
FIG. 1 shows a schematic layout diagram of an exemplary monitored area within which the present invention may be used.

FIG. 1 shows a schematic layout diagram of an exemplary monitored area 10 within which a location system 12 may operate. Area 10 may represent a small or medium size area throughout which any number of known-position locators 14 have been arranged. In addition, any number of locatable units 16, of which FIG. 1 shows only one, may also be present in area 10. As depicted by shaded shapes in FIG. 1, area 10 may also include any number of reflectors 18.

From application to application, area 10 may exhibit a wide variety in shape, size, and the number of reflectors 18 included. As a typical example, area 10 may represent a school, prison, college, hospital, corporate, or other campus that includes several buildings. However, area 10 is not limited to these applications and may represent smaller areas, such as an individual building, or larger areas, such as an entire city. Reflectors 18 represent physical structures in area 10 that tend to reflect electromagnetic location signals. Those skilled in the art will appreciate that building walls, fences, vehicles, and numerous other structures act as reflectors 18.

The present invention incorporates a conventional multilateration calculation process to determine the position of locatable unit 16 within area 10. More precisely, the positions of known-position locators 14 are known to system 12, and the multilateration calculation process determines the position of locatable unit 16 relative to the positions of known-position locators 14. Known-position locators 14 are desirably distributed throughout area 10 so that advantageous geometries for the multilateration calculation process will be available from substantially all points within area 10. At least three known-position locators 14 are involved with a location signal 20 to determine a position for locatable unit 16 in two dimensions, and at least four known-position locators 14 are involved for three dimensional locations. The precise positioning will vary from area 10 to area 10, and a suitable arrangement of known-position locators 14 may, at least in part, be determined empirically.

On the other hand, those skilled in the art will appreciate that in order to limit costs and reduce processing requirements, the number of known-position locators 14 is held as low as possible. Nevertheless, known-position locators 14 need not determine azimuth data for location signals 20 communicated between known-position locators 14 and locatable unit 16. Consequently, complexity and costs are less than they would be in a multiangulation location system.

FIG. 1 depicts a preferred embodiment of the present invention wherein locatable unit 16 transmits a location signal 20 that is or may be received by several known-position locators 14. Measurements are made to identify the points in time which occur when location signal 20 arrives at the various known-position locators 14. The multilateration calculation process operates in response to these measurements.

However, the present invention may be applied to numerous variants of this preferred embodiment. For example, known-position locator 14 may alternatively transmit location signals 20 serially, and such serially-transmitted location signals 20 may desirably be encoded to identify the coordinates of the transmitting known-position locator 14 and the points in time when the location signals 20 are being transmitted. In another variant, locatable unit 16 may be configured as a transponder that receives a location signal 20 transmitted by a known-position locator 14 and responds by transmitting another location signal 20. Moreover, a pre-estimation process, discussed below, can be useful in connection with multiangulation and other location determination systems. These and other obvious variants of the preferred embodiment are included within the scope of the present invention.

As depicted by dotted lines in FIG. 1, location signal 20 may propagate directly between locatable unit 16 and some of known-position locators 14 without reflection. On the other hand, other known-position locators 14 may receive location signal 20 via a reflected, multipath route. The multilateration calculation process is based upon the principle that electromagnetic signals travel at a constant speed (the speed of light in air) between the receiving known-position locators 14 and locatable unit 16. However, for a given known-position locator 14, if the location signal 20 travels directly without reflection it traverses a shorter distance in less time than when it experiences multipath. Accordingly, to the extent that the multilateration calculation process relies upon multipath data, it errs in identifying a position for locatable unit 16. Consequently, as discussed in more detail below, system 12 screens out multipath data so that such data do not corrupt the multilateration calculation process.

Figure 2:
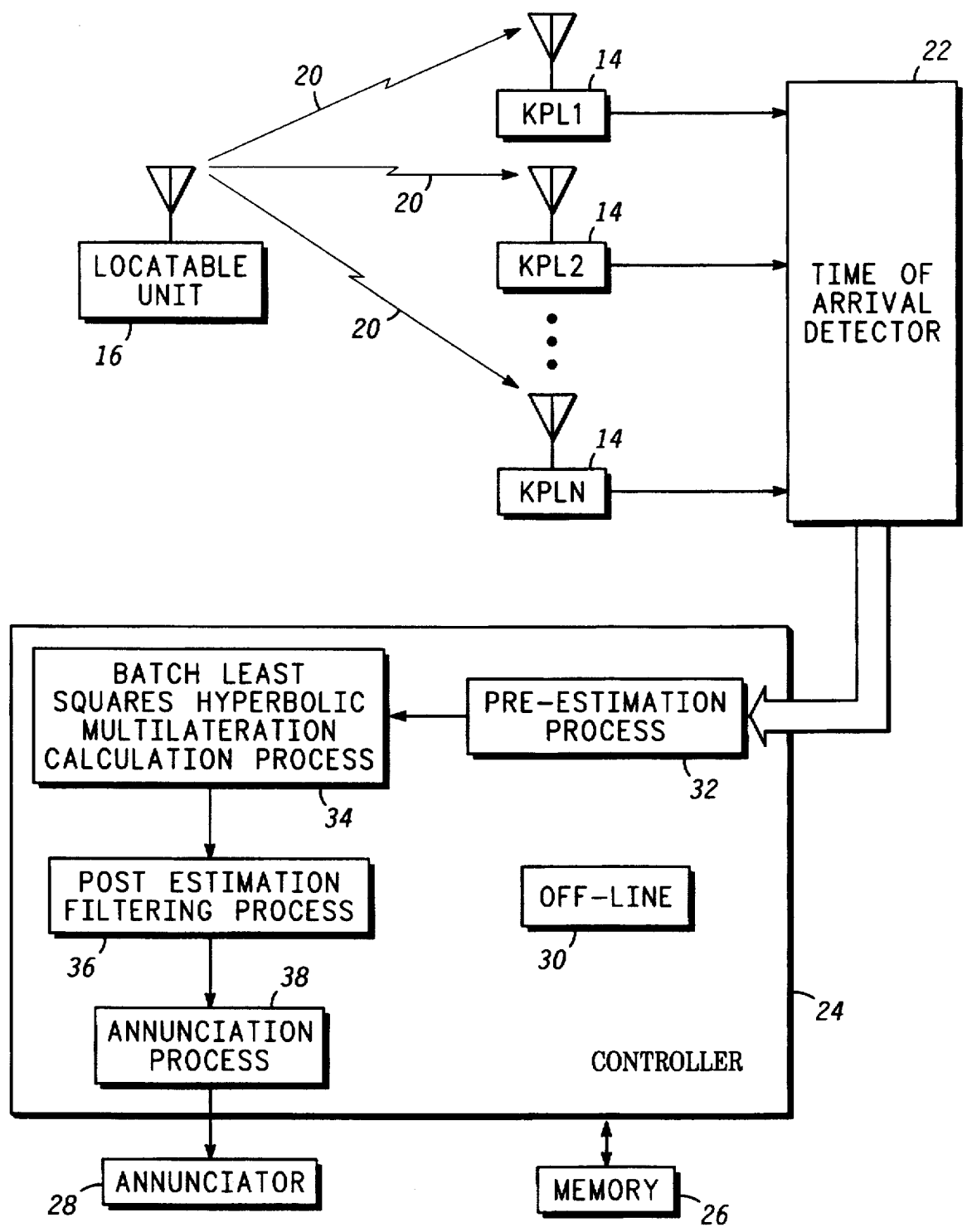
FIG. 2 shows a block diagram of components used in a preferred embodiment of the present invention.

FIG. 2 shows a block diagram of components used by system 2. In the preferred embodiment, locatable unit 16 is a portable spread spectrum transmitter. However, locatable unit 16 may be similar to other portable communication devices typically used in multilateration location systems. A receiving set of known-position locators (KPLs) 14 receive the location signal 20 transmitted by locatable unit 16. Not all known-position locators 14 used by system 12 need to receive location signal 20. Known-position locators 14 are configured to receive the location signal 20 broadcast by locatable unit 16.

Known-position locators 14 each couple to a time of arrival detector 22. Detector 22 identifies the points in time that occur when location signal 20 arrives at the various known-position locators 14 in the receiving set of locators 14. Of course, location signal 20 may arrive at known-position locators 14 at a variety of different instants, and detector 22 may distinguish such instants from one another to the degree necessary to achieve the precision desired by system 12. In the preferred embodiment, detector 22 distinguishes instants in time that are on the order of a few nanoseconds from one another so that a position accuracy of a few meters results.

Time of arrival detector 22 couples to a controller 24. Controller 24 couples to a memory 26 and an annunciator 28. Controller 24 represents a personal computer, computer workstation, or other programmable machine which can implement a multilateration process upon the timing data measured by detector 22. Controller 24 performs various processes in response to instructions which are stored in memory 26. In addition, memory 26 stores tables, databases, lists, and other memory structures that are useful, as discussed in more detail below, in carrying out a preferred embodiment of the present invention. Annunciator 28 provides one or more output devices that announce data related to locations for locatable unit 16. Annunciator 28 may represent a video display, light board, audible alarm, and the like.

FIG. 2 shows blocks for various processes performed by controller 24. For example, an off-line process 30 may be performed at a time when system 12 is not actively involved in locating locatable unit 16. As discussed in more detail below in connection with FIG. 3, off-line process 30 sets up a table that is used by on-line processes in locating locatable unit 16. A pre-estimation process 32 operates upon data measured by time of arrival detector 22 and compiles a list of arrival time differences that are processed by a batch least squares hyperbolic multilateration calculation process 34. Pre-estimation process 32 is discussed in more detail below in connection with FIG. 4.

Process 34 represents a conventional hyperbolic multilateration calculation process of a type known to those skilled in the art. Process 34 calculates a position estimate for locatable unit 16. Process 34 performs a statistical analysis in response to location signal 20 and to the differences in times of arrival measured by detector 22. From this analysis, process 34 identifies an error ellipse which defines an area within monitored area 10 (see FIG. 1) where, to a given degree of certainty, locatable unit 16 resides. Desirably, the error ellipse is as small as possible to improve the precision with which locatable unit 16 can be located. However, multipath location signals 20 corrupt the precision and cause the error ellipse to expand.

The locations identified by multilateration calculation process 34 are further refined in a post-estimation filtering process 36, and a filtered location is passed to an annunciation process 38. Post-estimation filtering process 36 is discussed in more detail below in connection with FIG. 5.

Annunciation process 38 is an optional process that adapts location information to a specific application. For example, in a security application, such as in connection with a prison, annunciation process 38 may determine if a location estimate for a prisoner's locatable unit 16 is in an unallowed area and activate annunciator 28 only if the location is forbidden. In another situation, process 38 may continually display a location for locatable unit 16.

Preferably, locatable unit 16 repeatedly transmits location signals 20. Thus, time of arrival detector 22 repeatedly measures timing data, and controller 24 repeatedly performs processes 32, 34, 36, and 38 to produce a stream of location estimates for locatable unit 16.

Figure 3:
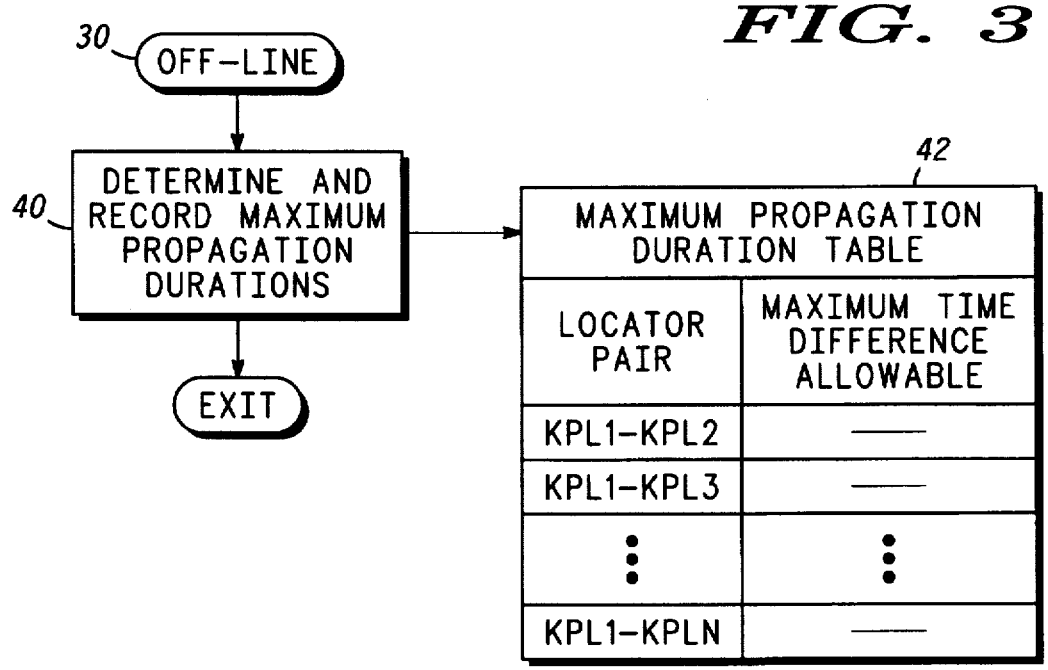
FIG. 3 shows a flow chart of an off-line process performed by a controller in a preferred embodiment of the present invention.

FIG. 3 shows a flow chart of off-line process 30. Process 30 may be performed at any time prior to when a location for a locatable unit 16 (see FIGS. 1–2) is to be determined. Process 30 performs a task 40 to determine and record maximum propagation durations, then exits. Task 40 records the maximum propagation durations in a maximum propagation duration table 42 maintained in memory 26 (see FIG. 2). Conventional data base management techniques may be used by task 40. The maximum propagation durations are determined in response to the distances between known-position locators 14 (see FIGS. 1–2).

In particular, task 40 identifies each combination of two known-position locators 14 in system 12 (see FIGS. 1–2). In other words, task 40 identifies all combinations of known-position locators 14 taken two at a time. When system 12 includes N, where N is an integer number, of known-position locators 14, there are N(N-1)/2 combinations of two known-position locators 14. If, for example, system 12 includes only three known-position locators KPL1, KPL2, and KPL3, then task 40 would identify three locator pairs, namely KPL1–KPL2, KPL1–KPL3, and KPL2–KPL3. On the other hand, if system 12 includes one hundred known-position locators 14, then task 40 identifies 4,950 locator pairs.

As discussed above, the position of each known-position locator 14 is known to system 12. Using the known positions for each known-position locator 14 of each locator pair, task 40 determines a maximum propagation duration for that pair and stores this duration in table 42 in a manner that associates it with the identity of the locator pair. The maximum propagation duration represents the time required for an electromagnetic signal to propagate between the two known-position locators 14 times a scaling factor. This value may be calculated and need not be measured. This maximum propagation duration is the maximum time difference allowable for data to be considered valid for processing by multilateration calculation process 34 (see FIG. 2). Greater durations are assumed to result from multipath.

As discussed below, multilateration calculation process 34 operates upon differences between the instances in time when location signal 20 arrives at different known-position locators 14. The best geometries for which multilateration calculation process 34 can precisely determine position result when the differences are smaller. In these situations, a locatable unit 16 resides roughly between both the receiving known-position locators 14. When a time difference has been corrupted by multipath and in poor geometry situations, location signal 20 often travels a much longer distance to reach one known-position locator 14 than another.

Due to the scaling factor, the maximum propagation durations are chosen somewhat arbitrarily. By making the maximum propagation durations larger, a greater amount of data, including multipath-corrupted data and valid data, are processed by multilateration calculation process 34. By making the maximum propagation durations smaller, a smaller amount of data, including a smaller amount of multipath-corrupted data and valid data, are processed by multilateration calculation process 34. However, by making the maximum propagation durations responsive to the distance between known-position locators 14 of each locator pair, roughly the same proportions of valid to corrupted data are maintained through area 10 (see FIG. 1). Moreover, multilateration calculation process 34 suffers little from screening out valid data that describe poor geometries for which locations could only be determined imprecisely anyway.

Desirably, the maximum propagation durations are in the range of 0.5 to 1.5 times the duration required for an electromagnetic signal to propagate a distance equal to the straight-line spacing between the two known-position locators 14 of each locator pair. By setting the maximum propagations in this range, a desirable balance between screening out corrupted data and screening out valid data results. In the preferred embodiment, the maximum propagation durations are set at 1.0 times the duration required for a signal to propagate between the two known-position locators 14 of each locator pair. Only a small amount of multipath-corrupted data appear to pass this screening test, and valid data which are screened out describe only poor geometries for multilateration calculation process 34.

Figure 4:
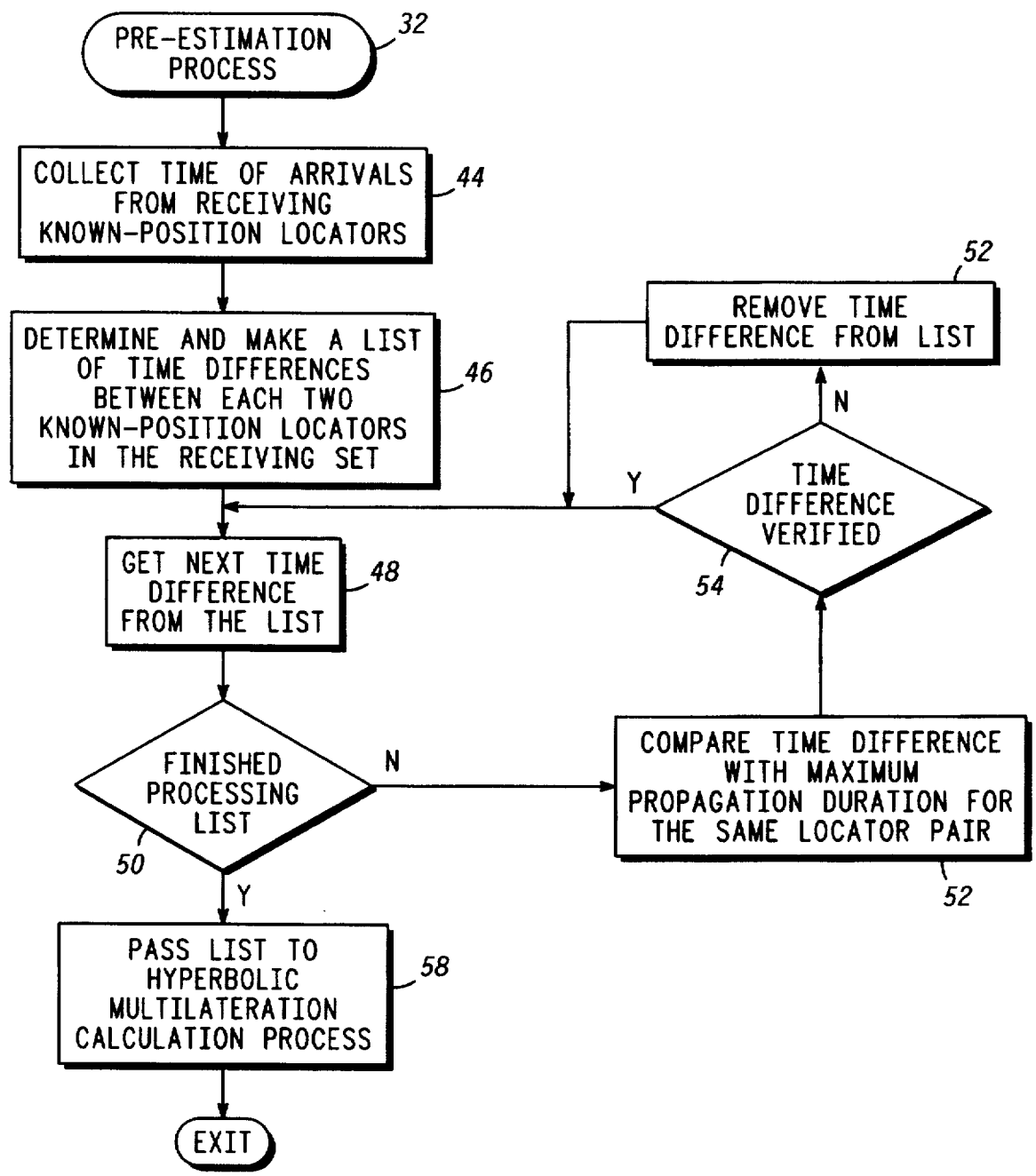
FIG. 4 shows a flow chart of a pre-estimation process performed by the controller.

FIG. 4 shows a flow chart of pre-estimation process 32. Process 32 is performed whenever time of arrival detector 22 (see FIG. 2) obtains a set of measurements describing the instances when location signal 20 is received at a receiving set of known-position locators 14. Generally speaking, process 32 screens out data collected by time of arrival detector 22 that appear likely to have resulted from multipath.

Process 32 performs a task 44 to collect the time of arrival data measured by time of arrival detector 22. Timing data need not be collected from all of known-position locators 14. Next, a task 46 determines time differences between each combination of two known-position locators 14 in the receiving set of known-position locators 14. In addition, task 46 makes a list of these time differences. The taking of time differences is a conventional step in connection with multilateration location systems because it compensates for not knowing the precise instant when location signal 20 was transmitted from locatable unit 16.

After task 46, process 32 performs a programming loop to evaluate each time difference included in the list made above in task 46. This loop includes a task 48 which gets a next time difference from the time difference list. Then, a query task 50 determines whether the loop has finished evaluating all entries from the time difference list. So long as task 50 determines that the loop has not finished processing the time difference list, a task 52 compares the time difference obtained above in task 48 with the maximum propagation duration for the time difference's location pair. Task 52 may obtain the proper maximum propagation duration by consulting table 42 (see FIG. 3).

After comparison in task 52, a query task 54 verifies the time difference. If the time difference is less than or equal to the maximum propagation duration allowed for the location pair, then the time difference is considered valid, and program control loops back to task 48. The time difference remains in the time difference list. If the time difference is greater than the maximum propagation duration allowed for the location pair, then the time difference is considered invalid, and a task 56 is performed. Task 56 removes the invalid time difference from the time difference list. After task 56, program control loops back to task 48.

Program control remains in the programming loop that includes tasks 48, 50, 52, 54, and possibly 56 until task 50 determines that the loop has finished processing the time difference list. At this point, program control proceeds to a task 58. Task 58 passes the time difference list to hyperbolic multilateration calculation process 34 (see FIG. 2), then program control exits process 32. The above-discussed programming loop has removed time differences that appear to have been corrupted by multipath.

Process 34 operates on the time difference list in a conventional manner to generate a location estimate for locatable unit 16. Due to the operation of pre-estimation process 32, multilateration calculation process 34 is responsive to time differences that are less than or equal to the maximum propagation durations set forth in table 42 (see FIG. 3), and multilateration calculation process 34 is substantially unresponsive to time differences that are greater than the maximum propagation durations set forth in table 42. As discussed above, the maximum propagation durations are established at a level that, for the most part, causes multipath and poor geometry data to be screened out. The remaining time differences in the time difference list at task 58 represent high quality data. Consequently, multilateration calculation process 34 makes a better estimate of position for locatable unit 16 than it would if pre-estimation process 32 were omitted.

Figure 5:
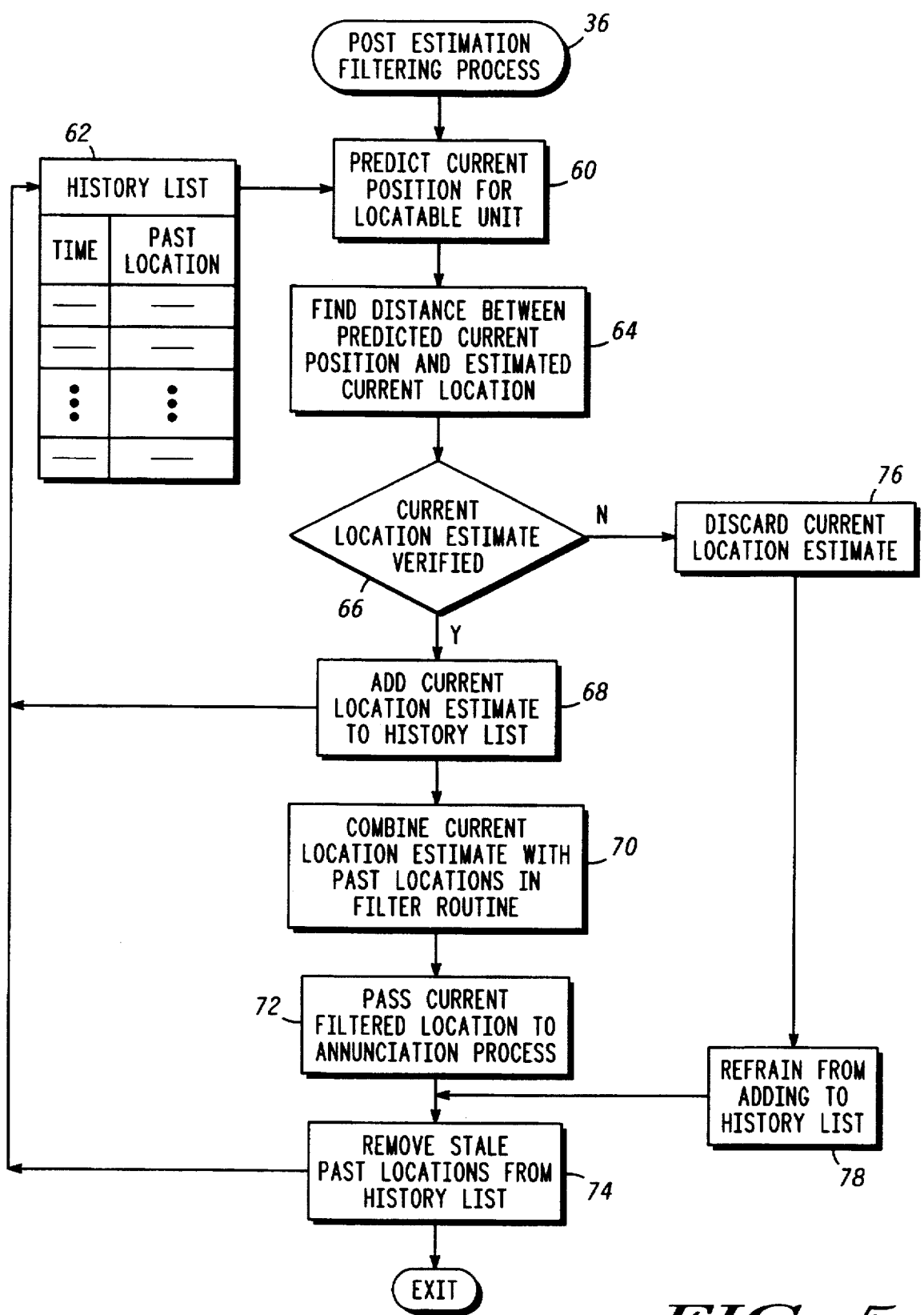
FIG. 5 shows a flow chart of a post estimation filtering process performed by the controller.

After multilateration calculation process 34 makes its estimate of a current location for locatable unit 16, the current location estimate is passed to post estimation filtering process 36, a flow chart of which is shown in FIG. 5. Process 36 performs a task 60 to predict a current position for locatable unit 16. Task 60 does not rely upon the current location estimate provided by multilateration calculation process 34. Rather, task 60 evaluates a history list 62 in making its prediction. History list 62 represents a memory structure maintained in memory 26 (see FIG. 2).

FIG. 5 depicts an exemplary block diagram of history list 62. History list 62 records a series of past locations for locatable unit 16 in association with time stamps that identify when the past locations were determined. In the preferred embodiment, task 60 assumes a constant velocity for locatable unit 16, and makes a linear prediction based upon the past locations, past timing, and a time for the current location estimate provided by multilateration calculation process 34.

After task 60, a task 64 finds the distance between the predicted current position obtained above in task 60 and the estimated current location recently determined by multilateration calculation process 34. Next, a query task 66 verifies the current location estimate. If the current location estimate resides within a predetermined distance of the predicted position, then the current location estimate is considered valid, and a task 68 adds the current location estimate to history list 62. The predetermined distance may be arbitrarily chosen to meet system needs.

After task 68, a task 70 combines the verified current location estimate with the past locations from history list 62 in a filtering routine. The particular filtering routine used in task 70 is not a critical feature of the present invention and numerous examples known to those skilled in the art may be used. The result of task 70 is that the current location estimate is converted into a filtered location for locatable unit 16.

After task 70, a task 72 passes the current filtered location to annunciation process 38 (see FIG. 2), where the location may or may not be annunciated depending on system needs. After task 72, a task 74 removes any stale past locations from history list 62. For example, task 74 may remove the oldest records from history list 62 so that stale locations do not exert an influence on future-determined locations.

Referring back to query task 66, when the current location estimate resides greater than a predetermined distance from the predicted current position, the current location estimate is considered invalid. In this situation, a task 76 is performed to discard the current location estimate. As illustrated in a task 78, process 36 refrains from adding the current location estimate to history list 62. After tasks 76 and 78, program control proceeds back to task 74 to maintain history list 62. Program control exits process 36 after task 74.

Accordingly, process 36 screens location estimates calculated by multilateration calculation process 34. Estimates that are too far distant from predicted positions are considered invalid and are discarded. Such estimates are assumed to have been based upon corrupt multipath data that passed through pre-estimation process 32 (see FIG. 4). Moreover, process 36 filters the current location estimates so that system 12 (see FIG. 1) smoothly tracks locatable unit 16 over time. However, the screening of process 36 refrains from including invalid current location estimates in the past data with which current data are filtered.

In summary, the present invention provides an improved location system and method. Electromagnetic signals are used in the location system of the present invention. Thus, the present invention does not suffer from the unreliability characteristics of ultrasonic or infrared location systems. Since the preferred embodiment of the present invention implements a multilateration location system, complexity and cost are less than with a multiangulation location system. Pre-estimation and post estimation processes screen out data that are assumed to have resulted from multipathing. Hence, the present invention tolerates multipath environments and may operate successfully in areas where numerous reflecting structures are present. The pre-estimation process uses the same type of timing data generated from a location signal to screen out multipath-corrupted data that a multilateration calculation process uses to calculate location. Thus, the pre-estimation process may be implemented in a multilateration location system with only a small amount of complexity and processing power.

The present invention has been described above with reference to preferred embodiments. However, those skilled in the art will recognize that changes and modifications may be made in these preferred embodiments without departing from the scope of the present invention. For example, those skilled in the art will appreciate that a location system may perform additional processes which are not directly related to the present invention and have not been discussed herein. Moreover, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. A multipath tolerant method for determining a location of a locatable unit comprising steps of:

a) determining a maximum propagation duration, said maximum propagation duration being determined in response to a distance between first and second known-position locators;

b) determining a time difference, said time difference being approximately equal to a difference between a propagation duration for at least one location signal traveling between said locatable unit and said first known-position locator and a propagation duration for said at least one location signal traveling between said locatable unit and said second known-position locator;

c) verifying that said time difference is less than or equal to said maximum propagation duration; and d) calculating a current location for said locatable unit in response to said step c), wherein said step d) is responsive to said at least one location signal when said time difference is less than or equal to said maximum propagation duration; and said step d) is substantially unresponsive to said at least one location signal when said time difference is greater than said maximum propagation duration.

2. A method as claimed in claim 1 wherein said step a) determines said maximum propagation duration to be in a range of 50% to 150% of a time required for an electromagnetic signal to propagate between said first and second known-position locators.

3. A method as claimed in claim 2 wherein said step a) determines said maximum propagation duration to be approximately the time required for an electromagnetic signal to propagate between said first and second known-position locators.

4. A method as claimed in claim 1 wherein said step d) calculates said current location in response to said at least one location signal.

5. A method as claimed in claim 4 wherein:

said at least one location signal is a single location signal transmitted by said locatable unit and said first and second known-position locators receive said single location signal; and said step d) calculates said current location in response to points in time that occur when said single location signal arrives at said first and second known-position locators.

6. A method as claimed in claim 5 wherein said step d) calculates said current location in response to said time difference.

7. A method as claimed in claim 1 wherein:

each locator from a set of known-position locators, said first and second known-position locators and at least one other known-position locator being members of said set, receive said at least one location signal;

said step a) determines maximum propagation durations for each combination of two locators from said set;

said step b) determines time differences for each combination of two locators from said set;

said step c) verifies that, for each combination of two locators from said set, said time difference determined in said step b) is less than or equal to said maximum propagation duration determined in said step a); and said step d) calculates said current location in response to time differences that are less than or equal to corresponding maximum propagation durations.

8. A method as claimed in claim 1 wherein said step d) comprises the step of performing, when said time difference is less than or equal to said maximum propagation duration, a least squares hyperbolic multilateration calculation which is responsive to said time difference.

9. A method as claimed in claim 1 additionally comprising the steps of:

repeating said steps b), c), and d) to obtain a second location;

combining said current location and second location to obtain a filtered location for said locatable unit.

10. A method as claimed in claim 1 additionally comprising the steps of:

repeatedly performing said steps b), c), and d) over a period of time to obtain a history of past locations for said locatable unit;

predicting a current position for said locatable unit in response to said past locations; and verifying that said current location is within a predetermined distance of said predicted current position.

11. A method as claimed in claim 10 additionally comprising the step of adding said current location to said history of past locations when said current location is within said predetermined distance of said predicted current position.

12. A method as claimed in claim 10 additionally comprising the step of refraining from adding said current location to said history of past locations when said current location is not within said predetermined distance of said predicted current position.

13. A method as claimed in claim 10 additionally comprising the steps of:

annunciating said current location when said current location is within said predetermined distance of said predicted position; and refraining from annunciating said current location when said current location is not within said predetermined distance of said predicted position.

14. A multipath tolerant multilateration method for determining a location of a locatable unit comprising the steps of:

a) arranging a set of at least three known-position locators within a monitored area;

b) communicating at least one location signal which propagates between each known-position locator in said set and a locatable unit located in said monitored area:

c) for each combination of two known-position locaters in said set, determining a maximum propagation duration, said maximum propagation duration being determined in response to the distance between the two known-position locaters, wherein said step of determining determines said maximum propagation duration for each combination of two known-position locaters in said set to be in a range of 50% to 150% of the time required for an electromagnetic signal to propagate between the two known-position locaters:

d) for each combination of two known-position locaters in said set, determining a time of arrival difference, said time of arrival difference being a duration approximately equal to the difference between propagation durations for said at least one location signal traveling between said locatable unit and each of the two known-position locators;

e) for each combination of two known-position locaters in said set, comparing said maximum propagation duration determined in said step c) with said time of arrival difference determined in said step d): and f) calculating a current location for said locatable unit in response to said step 15. A method as claimed in claim 14 wherein said step f) calculates said current location in response to said time of arrival differences that are less than or equal to corresponding maximum propagation durations.

16. A method as claimed in claim 15 wherein said calculations of said step f) are substantially unresponsive to said time of arrival differences that are greater than corresponding maximum propagation durations.

17. A method as claimed in claim 14 wherein said step f) comprises the step of performing a least squares hyperbolic multilateration calculation which is responsive to said time of arrival differences that are less than or equal to corresponding maximum propagation durations.

18. A method as claimed in claim 14 additionally comprising the steps of:

repeatedly performing said steps b), d) e), and f) over a period of time to obtain a history of past locations for said locatable unit;

predicting a current position for said locatable unit in response to said past locations; and verifying that said current location is within a predetermined distance of said predicted current position.

19. A location determination system that tolerates multipath transmissions of location signals, said system comprising:

a locatable unit positioned in a monitored area:

first and second known-position locators arranged to transmit at least one location signal to or receive said at least one location signal from said monitored area;

means for identifying a maximum propagation duration, said maximum propagation duration being determined in response to a distance between said first and second known-position locators:

means for forming a time difference, said timed difference being approximately equal to the difference between a first duration during which said at least one location signal propagates between said locatable unit and said first known-position locator and a second duration during which said at least one location signal propagates between said locatable unit and said second known-position locator;

means, coupled to said identifying means and to said forming means, for verifying that said time difference is less than or equal to said maximum propagation duration: and means, coupled to said verifying means, for calculating a current location for said locatable unit, wherein said calculating means is configured to be responsive to said at least one location signal when said time difference is less than or equal to said maximum propagation duration and said calculating means is configured to be substantially unresponsive to said at least one location signal when said time difference is greater than said maximum propagation duration.

20. A location determination system as claimed in claim 19 wherein said identifying means is configured so that said maximum propagation duration is in a range of 50% to 150% of the time required for an electromagnetic signal to propagate between said first and second known-position locators.

21. A location determination system as claimed in claim 19 wherein:

said at least one location signal is a single location signal transmitted by said locatable unit, and said first and second known-position locators receive said single location signal; and said calculating means is configured to calculate said current location in response to points in time when said single location signal arrives at said first and second known-position locators.

22. A location determination system as claimed in claim 19 wherein said calculating means is configured to perform, when said time difference is less than or equal to said maximum propagation duration, a least squares hyperbolic multilateration calculation which is responsive to said time difference.

23. A location determination system as claimed in claim 19 additionally comprising means, coupled to said calculating means, for recording a history of past locations for said locatable unit;

means, coupled to said recording means, for predicting a current position for said locatable unit in response to said past locations; and means, coupled to said predicting means, for verifying that said current location is within a predetermined distance of said predicted current position.

\* \* \* \* \*

UNITED STATES PATENT AND TRADEMARK OFFICE
CERTIFICATE OF CORRECTION

PATENT NO. : 5,534,876
DATED : July 9, 1996
INVENTOR(S) : Bart Jeffrey Erickson et al.

It is certified that error appears in the above-indentified patent and that said Letters Patent is hereby corrected as shown below:

In column 11, claim 14, line 25, after the word "step" insert --e).--.

In column 12, claim 19, line 3, delete the word "timed" and substitute --time--.

Signed and Sealed this

Tenth Day of December, 1996

Attest:

BRUCE LEHMAN

*Attesting Officer*    *Commissioner of Patents and Trademarks*